United States Patent [19]
Mayer

[11] 3,888,495
[45] June 10, 1975

[54] DUAL-COOLED SLIDE RING SEAL

[76] Inventor: Ehrhard Mayer, Birkenallee 13, D8191 Eurasburg, Germany

[22] Filed: June 11, 1973

[21] Appl. No.: 368,596

[30] Foreign Application Priority Data
June 9, 1972 Germany............................ 2228296
July 27, 1972 Germany............................ 2236964

[52] U.S. Cl...................................... 277/3; 277/67
[51] Int. Cl............................................. F16j 15/40
[58] Field of Search............. 277/3, 61, 62, 67, 93, 277/93 SD

[56] References Cited
UNITED STATES PATENTS

| | | | |
|---|---|---|---|
| 2,628,852 | 2/1953 | Voytech................................. | 277/61 |
| 3,236,529 | 2/1966 | Heim..................................... | 277/67 X |
| 3,360,272 | 12/1967 | Blom et al............................ | 277/3 |
| 3,588,124 | 6/1971 | Guinard................................. | 277/3 |
| 3,591,188 | 7/1971 | Eisner................................... | 277/62 |
| 3,746,350 | 7/1973 | Mayer et al.......................... | 277/67 |

*Primary Examiner*—Harry N. Haroian
*Attorney, Agent, or Firm*—Jerry Cohen; Charles Hieken

[57] ABSTRACT

A drive shaft passing through a wall into a pressurized working fluid environment is sealed by two spaced slide ring/counter ring pairs which surround the shaft. An axially innermost one of the pairs extends radially from a first high pressure region related to the pressurized fluid environment to a second high pressure region of a sealing and cooling fluid recirculation loop serving both of the pairs. A built-in pump of the sealing device, driven by the shaft propels said sealing and cooling fluid and builds up the pressure at said second region so that such pressure is higher than the first pressure region by a pressure difference (DP). Flow restrictions are built into the recirculating loop so that the sum of pressure drops therein is at least equal to DP.

10 Claims, 1 Drawing Figure

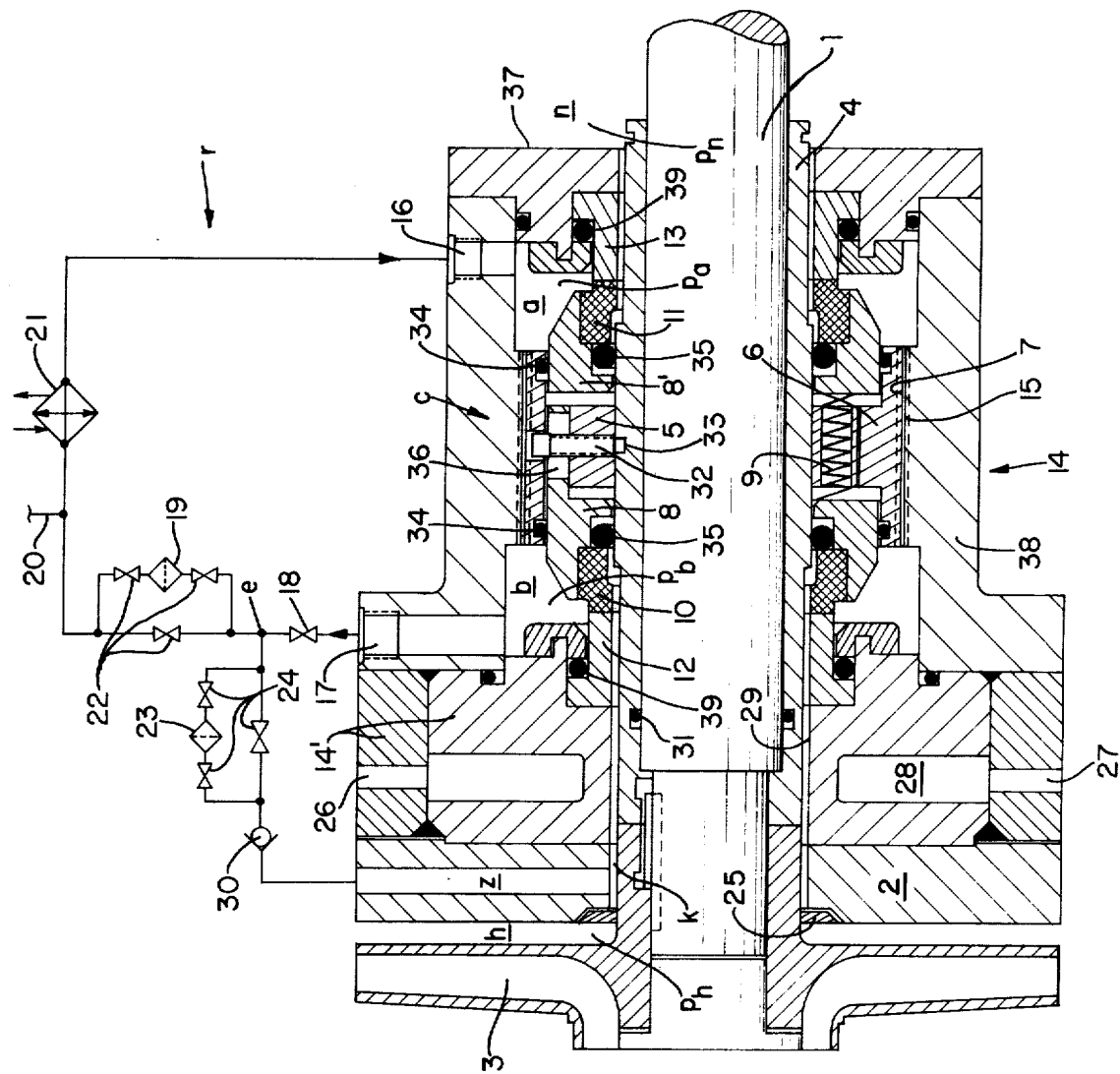

DUAL-COOLED SLIDE RING SEAL

CROSS REFERENCE TO RELATED APPLICATIONS

This application is of common assignment with co-pending U.S. applications Ser. No. 18,820, filed Mar. 12, 1970, and Ser. No. 308,006, filed Nov. 20, 1972, the disclosures of both of which are incorporated herein by reference as though set out at length herein.

BACKGROUND OF THE INVENTION

The present invention relates to a dual cooled slide ring shaft seal assembly with dynamic seals comprising slide ring/counter ring pairs and a pump mechanism arranged in the seal assembly and driven by the rotary shaft to be sealed.

Such seals and pump mechanisms, known per se and more particularly described in the above cited applications, convey a liquid sealing and cooling fluid from a first annular space surrounding one such slide ring and counter ring pair into a second annular space surrounding a second slide ring and counter ring pair. The seal assembly is in a wall forming part of a working fluid container for the shaft driven (or driving) body, e.g., pump, turbine, stirrer. The working fluid has to be sealed. A recirculation loop is provided for the sealing and cooling fluid and connects the above first space to the second space and contains at least one heat exchanger and has an injection point which is connected to a presurized source which replaces the sealing and cooling fluid that escapes due to leakage.

It is known in slide ring seals of this type to provide an overpressure of the mentioned second space with respect to the high-pressure side of the working fluid which is interconnected to the second slide ring/counter ring to prevent penetration of foreign bodies into the seal gap and for other functional reasons. This is achieved by connecting an injection point of the recirculation loop to a gas-charged supply container. This supply container replaces the sealing and cooling agent escaping from the seal due to leakage and in turn is continuously refilled by a separate high-pressure pump. In order to achieve small spatial dimensions for the pump mechanism arranged in the seal assembly and conducting the sealing and cooling agent through the heat exchanger into the circuit and in order to keep down the amount of heat generated by the pump mechanism itself, known slide-ring seals are so designed as to attempt to achieve the lowest possible flow resistance in the recirculation loop. The throughput volume of sealing and cooling agent in the recirculation loop is determined by the amount of heat to be absorbed by the heat exchanger and by the temperature limits to be maintained, which depend on the type and field of utilization of the seal. The overpressure of the second annular space with respect to the working fluid high-pressure side, which usually amounts to 1-3 atmospheres, is also provided with these aims in mind. The overpressure itself is determined essentially by the pressure of the external source which is connected to the injection point. The position of the injection point in the recirculation circuit can be chosen practically freely in the known slide-ring seals. Low flow resistances and consequent low pressure-drops existing therein assure that location of the injection point has no substantial influence on the pressure ratios, particularly on the sought overpressure with respect to the high-pressure side. Such types of slide-ring seals indeed satisfy the requirements imposed on them and also permit the use in the cooling circuit of the seal of a sealing and cooling fluid different from the working fluid to be sealed, but are very costly and this prohibits their use in many applications.

It is an important object of the present invention to provide a more economical dual cooled slide-ring seal of the above described type.

It is a further object of the invention to allow elimination of the prior art gas-charged supply container and its pump and mechanisms for indicating and controlling gas supply.

It is a further object of the invention to provide sealing, using a recirculating heat exchange and sealing fluid, in a limited space consistent with one or more of the preceding objects.

It is a further object of the invention to provide automatic regulation of the above described overpressure and make-up of sealing and heat exchange fluid leakage losses consistent with one or more of the preceding objects.

SUMMARY OF THE INVENTION

According to the present invention, the pump mechanism is designed for the generation of a feed pressure which is higher than the provided overpressure of the second space with respect to the high-pressure side for a given throughput volume of sealing and cooling agent. The recirculation loop includes flow resistances which produce a total pressure drop at least equal to the provided overpressure and which is smaller than the discharge pressure of the pump mechanism. An injection point for makeup sealing and cooling fluid is so located that between the injection point and the second space in the recirculation loop there is a flow resistance which at the given throughput generates a pressure drop corresponding essentially to the provided overpressure. Preferably, the injection point is connected to a high-pressure-side tapping point for the working fluid.

In contrast with known slide-ring seals, the provided overpressure is generated not by the pressure of the source connected to the injection point but rather by the pump mechanism arranged in the seal case in conjunction with an appropriate lay-out of the recirculation loop and a particular position of the injection point, which itself is under the pressure of the high-pressure side. This offers the advantage that an additional pump and gas supply container located outside the seal become dispensable. Also this eliminates the automatic control devices for adjusting the pressure at the injection point, because with a shaft rotating at a constant speed the discharge pressure of the seal assembly pump mechanism remains constant independently of pressure fluctuations on the working fluid high-pressure side, so that even with such fluctuations an essentially constant over-pressure of the second space with respect to the high-pressure side is maintained.

At least a portion of the recirculation loop flow resistance contained between the second space and the injection point can be formed by the heat exchanger and-/or a filter. But this flow resistance can also be formed wholly or partly of an additionally inserted throttle section, consisting preferably of an adjustable valve, which in an advantageous embodiment is constructed as a check valve impeding flow in the direction toward the second space. A filter may also be inserted in the line leading from the working fluid tap to the injection point. The filters prevent damaging particles from reaching the slide-ring seal. A filter suitably inserted between the tapping point and the injection point is especially desirable if there is no filter in the recirculation loop or if the working fluid to be sealed is highly loaded with damaging particles, so that the filter contained in the recirculation loop is reserved for the task of eliminating particles produced by abrasion of the slide rings and counter rings themselves.

The tapping point advantageously discharges into a chamber, demarcated from the high-pressure side by a narrow point, which accepts the leakage of the second slide ring and counter ring pair. Accordingly, there penetrates into this chamber from the working fluid high-pressure side only a volume of agent to be sealed and therein contained damaging particles which corresponds to the leakage of sealing and heat exchange at the first side slide ring and counter ring pair, the leakage at the second pair being, in effect, recycled. A further improvement can be achieved if the narrow point is formed by a centrifugal disk rotating with the shaft which centrifuges particles contained in the passing working fluid and thus does not allow them to reach the tapping point.

In some applications of slide-ring seals, operating conditions can arise which lead to a pressure drop down to zero and even to an underpressure at the high-pressure side of the seal and thus also at the tapping point. Such operating conditions can be anticipated, in particular, if the seal is used for large boiler-feed pumps which operate at least secondarily in the cavitation range. These operating conditions can cause the liquid sealing and cooling agent to be wholly or partly sucked out of the seal case so that there can result a dry running of the slide rings with simultaneous absence of cooling.

This aspiration of the liquid sealing and cooling agent from the seal case and/or from the recirculation circuit can be prevented according to another feature of the invention in that between the injection point and the tapping point there is arranged a check valve which prevents a backflow of the sealing and cooling agent from the injection point to the tapping point. Preferably a check valve is used which, with pressure loading in its conducting direction, already opens at an applied pressure difference which is small compared with the provided overpressure of the second space with respect to the high-pressure side.

BRIEF DESCRIPTION OF THE DRAWING

These and other objects, features and advantages of the invention will be apparent from the following detailed description with reference therein to the accompanying drawing the single FIGURE of which is a longitudinal section through the slide-ring seal and also a schematic illustration of the recirculation loop and its connection to the tapping point at the high-pressure side.

DETAILED DESCRIPTION OF PREFERRED EMBODIMENTS

Referring now to the drawing, a rotary shaft 1 passes through a wall 2 which separates a high-pressure side $h$ from a low-pressure side $n$. If there are special requirements on the seal, the high-pressure side $h$ can also consist of the interior of a preceding additional seal and the low-pressure side $n$ can likewise consist of the interior of a succeeding additional seal.

Fastened to the shaft 1 in a rotationally fixed manner are a pump impeller 3 on the high-pressure side $h$ and a shaft sleeve 4 extending over the entire axial length of the seal which sleeve is sealed off from the shaft by an O-ring 31. Approximately in the middle of its axial extension the shaft sleeve bears a ring 5 to which in turn a hollow cylindrical member 6 projecting on both sides is fastened concentrically with the shaft axle into whose outer periphery is cut a feed thread 7. The ring 5 and member 6 are held by several radially extending screws, one of which is indicated 32, which are screwed into the ring with their tips engaged in recesses 33 of the shaft sleeve 4 and with their heads securing the member 6 against rotational motion and against axial displacement motion relative to the ring.

In the two annular depressions formed by the shaft sleeve 4, ring 5 and hollow cylindrical member 6 there are arranged two support sleeves 8,8' which are sealed off by O-rings 34, 35 from the inner periphery of the hollow cylindrical member 6 and from the shaft sleeve 4, respectively. The support sleeves are movable in the axial direction of shaft 1, but are connected to this shaft in a rotationally fixed manner by means of axial projections 36 thereof contacting the screws 32. Moreover, they are so prestressed by pressure springs 9 that they endeavor to move apart from one another. A slide ring 10 or 11 is fastened to the side of each support sleeve 8, 8' that faces away from the ring 5.

Under the action of the pressure springs 9, the slide rings 10 and 11 are pressed against counter rings 12 and 13, respectively. The slide ring/counter ring pair 11/13 comprises a first low-pressure seal and the pair 10/12 comprises a second high-pressure seal. The counter rings are supported in a stationary manner in the top part 37 and bottom part 14', respectively, of a seal casing designated in its entirety by 14. The axially central, hollow, cylindrical part 38 of the seal case 14 surrounds both seals and in the region of the feed thread 7 has a stationary internal thread 15 which has a counterrotating construction (reversed pitch direction) with respect to external thread 7 and surrounds the latter with only slight radial play. The external thread 7 and the internal thread 15 form the active part of a pump mechanism designated in its entirety by $c$.

Annular spaces are situated on either side of the pump mechanism. The first space $a$ is sealed from the working fluid low-pressure side $n$ by the slide ring and counter ring pair 11, 13 and is connected to an inlet borehole 16, while the second space $b$ is sealed from the working fluid high-pressure side $h$ by the other slide ring/counter ring pair 10, 12 and is connected to an outlet borehole 17. The outlet borehole 17 is connected to the inlet borehole 16 via a recirculation loop which is designated in its entirety by $r$ and which contains in succession a combined throttle and check valve 18, a magnetic filter 19 for the extraction of abraded particles, a vent valve 20 and a heat exchanger 21. The magnetic filter can have additional shutoff valves 22 so that a bypass can be created during its cleaning without interrupting operation.

An injection point $e$ situated between the magnetic filter 19 and the throttle and check valve 18 is connected via another magnetic filter 23, which likewise can contain shutoff valves 24 to create a bypass, and via a check valve 30 to a tapping point z which discharges into an annular chamber k which is bounded by the shaft sleeve 4 and the pump impeller shaft, the bottom part 14' of the seal case, the borehole of wall 2, the high-pressure-side slide ring/counter ring pair 10, 12, and by a centrifugal disk 25. The centrifugal disk rotates with the shaft 1 and heavier particles possibly contained in the working fluid are centrifuged before they can arrive into the chamber k.

From the high-pressure side h, the cleaned agent to be sealed can reach the injection point e by going past the centrifugal disk 25 via the chamber k through the tapping point z, the check valve 30 open in this flow direction and the magnetic filter 23. From here fluid can penetrate into the seal via the heat exchanger 21 and the inlet borehole 16 and then fills the first space a, the pump mechanism c and the second space b. Further inflow at the injection point e occurs subsequently only to the extent that the sealing and cooling agent is lost due to leakage. The pressure at the injection point e therefore matches the pressure $p_h$ of the high-pressure side h. Working fluid is the sole source of cooling and sealing fluid in this embodiment.

When shaft 1 rotates, the pump mechanism c feeds the sealing and cooling fluid into a circuit from the first space a into the second space b and via the recirculation loop r back to the first space a. The volume of sealing and cooling agent which is conducted into the circuit per unit time is determined by the amount of heat to be conducted away from the seal and by the permissible inlet and outlet temperatures. The overpressure between the second space b and the high-pressure side h, i.e., the pressure difference $p_b - p_h$, results from the special construction of the seal, and its field of utilization and usually amounts to 1 – 3 atmospheres. The throttle and check valve 18 situated between the injection point e and the outlet borehole 17 is so adjusted that (possibly taking into consideration other flow resistances contained in this branch) it has a flow resistance which corresponds to the desired overpressure. The pump mechanism c is sized such that at the prescribed throughput volume of sealing and cooling agent it has a feed pressure which is at least as large as pressure drop originating between the outlet borehole 17 and the injection point e, diminished by the pressure drop in the remaining portion of the circulation circuit.

When the pump mechanism c is rotated, there arises in the second space b a pressure $p_b$ which is equal to the pressure $p_h$ plus the pressure drop between the injection point e and the outlet borehole 17. The pressure in the first space a corresponds to the pressure $p_h$ reduced by the pressure drop existing in the rest of the recirculation loop r. If the working fluid has a high temperature, then in the bottom part 14' of the seal case 14 supporting the high-pressure-side counter ring 12 there is arranged an annular chamber 28 to which a cooling agent, e.g., water, is supplied via an inflow borehole 26 and then is discharged again via an outflow borehole 27.

This annular chamber prevents the wall 2 from inadmissibly heating the seal case 14 and particularly the counter ring 12 and the O-ring 39 sealing the latter. The bottom part 14', which because of the therein contained annular chamber 28 has a considerable axial length, surrounds the shaft sleeve 4 and the hub of the pump impeller 3 at a slight radial distance, so that the high-pressure-side slide ring/counter ring pair 10, 12 is connected to the high-pressure side h only via a relatively narrow annular cooled channel through which only the leakage flows and therefore can also not be heated by the working fluid itself.

If during operation the pressure at the high-pressure side h, specifically at the tapping point z, falls to zero or if an underpressure occurs there, then the check valve 30 prevents the cooling and sealing agent from leaving the seal case or the recirculation loop r via the injection point e. The same beneficial action is achieved in the event that the rotational direction of the shaft changes in an operating phase and the pump mechanism c then feeding in the reverse direction generates an overpressure due to the throttle valve 18 at the injection point e.

I claim:

1. Shaft seal apparatus for securing to a wall of a working fluid container to surround a shaft passing through a hole in said wall from a high pressure region inside said container to a low pressure region outside said container and comprising means defining a seal casing attached to said wall, means defining a first space situated in the seal case and sealed from the low-pressure region by a first slide ring and counter ring pair, means defining a second space, means defining a second slide ring and counter ring pair sealing said second space from the high-pressure region means forming an overpressure in said second space with respect to said high-pressure region, means defining a recirculation loop bypassing said first and second slide ring-counter ring pairs for a sealing and cooling fluid which connects the first space to the second space via said pump means within said casing and also connects said space in a return portion of said loop outside said casing which contains at least one heat exchanger and has at least one injection point at an intermediate point of said loop outside said casing which is connectable to at least one pressurized source which replaces the sealing and cooling fluid that escapes due to leakage, and wherein the pump drives fluid from said first to second spaces within said casing and from said second to first spaces outside the casing, the pump discharge pressure is greater than the provided overpressure $(p_b - p_h)$ of the second space with respect to the high-pressure region and the high-pressure region comprises at least a portion of said pressurized sources, the portion of said recirculation loop outside said casing comprises flow resistances which cause a pressure drop $(\Sigma \Delta p)$ which is at least equal to the provided overpressure $(p_b - p_h)$ and is smaller than discharge pressure of the pump, and the recirculation loop further comprises flow resistance between the injection point and the second space which generates a pressure drop corresponding essentially to the rp provided overpressure $(p_b - p_h)$.

2. Shaft seal apparatus in accordance with claim 1 wherein at least a portion of the recirculation loop flow resistance contained between the second space and the injection point is formed by a heat exchanger.

3. Shaft seal apparatus in accordance with claim 1 wherein
at least a portion of the recirculation loop flow resistance between the second space and the injection point is formed by a throttle section.

4. Shaft seal apparatus in accordance with claim 3 wherein
the throttle section comprises an adjustable valve.

5. Shaft seal apparatus in accordance with claim 4 wherein
the valve is constructed as a check valve impeding flow in the direction toward the second space,
a filter is connected between the check valve and the injection point,
the apparatus further comprising a centrifugal baffle therein for deflecting fluid entrained particles.

6. Shaft seal apparatus in accordance with claim 1 wherein
at least a portion of the recirculation loop flow resistance contained between the second space and the injection point is formed by a heat exchanger.

7. Shaft seal apparatus in accordance with claim 1 wherein
at least a portion of the recirculation loop flow resistance between the second space and the injection point is formed by a throttle section.

8. Shaft seal apparatus in accordance with claim 1 wherein
the throttle section comprises an adjustable valve.

9. Shaft seal apparatus in accordance with claim 1 and further comprising
said shaft in combination therewith.

10. Shaft apparatus and seal apparatus for securing to a wall of a working fluid container to surround a shaft passing through a hole in said wall from a high-pressure region inside said container to a low pressure region outside said container and comprising
means defining a rotary shaft,
means defining a seal casing attached to said wall,
means defining a pump arranged in the seal casing having a stator portion mounted on said casing and a rotor portion mounted on the shaft and comprising confronting cylindrical members with spiral threads of opposite hand thereon,
means defining a first space situated in the seal case and sealed from the low-pressure region by a first annular slide ring and counter ring pair,
means defining a second space,
means defining a second annular slide ring and annular counter ring pair sealing said second space from the high-pressure region,
said slide rings of the first and second pairs being mounted on said shaft concentrically arranged and axially inward of their respective counter rings,
said counter rings being mounted on said casing,
means for resiliently urging said slide rings axially outwardly,
means forming an overpressure in said second space with respect to said high-pressure region,
additional means for cooling said second slide ring-/counter ring pair,
means defining a recirculation loop bypassing said first and second slide ring-counter ring pairs for a sealing and cooling fluid which connects the first space to the second space via said pump within said seal casing and also connects said spaces in a return portion of said loop outside said casing which contains at least one heat exchanger and has an injection point at an intermediate point of said loop outside said casing which is connected via a check valve to a tap of the container in the high-pressure region via a path which includes a centrifugal baffle mounted on said shaft at the axial location of the wall therealong, and wherein
the pump drives fluid from said first to second spaces within said casing and from said second to first spaces outside the casing,
the pump mechanism pressure is greater than the provided overpressure $(p_b - p_h)$ of the second space with respect to the high-pressure region and the high pressure region comprises at least a portion of said pressurized sources,
the portion of said recirculation loop outside said casing comprises flow resistances which cause a pressure drop $(\Sigma \Delta p)$ which is at least equal to the provided overpressure $(p_b - p_h)$ and is smaller than discharge pressure of the pump, and
the recirculation loop further comprises flow resistance between the injection point and the second space which generates a pressure drop corresponding essentially to the provided overpressure.

* * * * *